United States Patent [19]
Visel et al.

[11] Patent Number: 6,121,346
[45] Date of Patent: Sep. 19, 2000

[54] RUBBER COMPOSITIONS CONTAINING FILLERS HAVING AGGREGATES CONTAINING DIFFERENT PARTICLE SIZES

[75] Inventors: Friedrich Visel, Bofferdange, Luxembourg; Uwe Ernst Frank, Marpingen, Germany; Rene Jean Zimmer, Howald, Luxembourg; Thierry Florent Edme Materne, Attert, Belgium; Giorgio Agostini, Colmar-Berg, Luxembourg

[73] Assignee: The Goodyear Tire & Rubber Company, Akron, Ohio

[21] Appl. No.: 09/033,491

[22] Filed: Mar. 2, 1998

[51] Int. Cl.⁷ .................................................. C08K 3/00
[52] U.S. Cl. ...................... 523/200; 523/205; 523/209; 523/215; 523/216; 524/442; 524/444; 524/445; 524/492; 524/493; 524/495; 524/496
[58] Field of Search .................................. 524/442, 444, 524/445, 492, 493, 495, 496; 523/200, 205, 209, 215, 216

[56] References Cited

U.S. PATENT DOCUMENTS

| | | | |
|---|---|---|---|
| 2,914,503 | 11/1959 | Pechukas | 260/41.5 |
| 5,227,425 | 7/1993 | Rauline | 524/493 |
| 5,430,087 | 7/1995 | Carlson et al. | 524/496 |
| 5,846,506 | 12/1998 | Esch et al. | 423/338 |

FOREIGN PATENT DOCUMENTS

| | | | |
|---|---|---|---|
| 0631982 | 1/1995 | European Pat. Off. | C01B 33/193 |
| 0647591 | 4/1995 | European Pat. Off. | C01B 38/193 |
| 0799867 | 10/1998 | European Pat. Off. | C09C 3/06 |

*Primary Examiner*—Edward J. Cain
*Attorney, Agent, or Firm*—Bruce J Hendricks

[57] ABSTRACT

A rubber composition containing a filler having individual aggregates containing both large and small particles, where the small particles are grafted onto the surface of the large particles. The small particles range from 1 to 30 weight percent of the overall weight of the filler. The large particles range from 70 to 99 weight percent of the overall weight of the filler. The small particles range in size of from 1 to 16 nanometers in diameter and the large particles range in size of from 17 to 500 nanometers in diameter.

37 Claims, No Drawings

RUBBER COMPOSITIONS CONTAINING FILLERS HAVING AGGREGATES CONTAINING DIFFERENT PARTICLE SIZES

BACKGROUND OF THE INVENTION

Nanomaterials are particles having a size of from 1 to 20 nanometers in diameter. Use of nanomaterials have been known in rubber. For example, in U.S. Pat. No. 4,644,988, there is disclosed a tire tread compound containing a styrene-butadiene copolymer rubber reinforced with a high structure carbon black designated as N103 and a particle size smaller than 20 nanometers. In addition, it is known from U.S. Pat. No. 4,474,908 that siliceous fillers having an ultimate particle size in the range of from 15 to 30 nanometers have been used in rubber. One advantage in using such nanomaterials in rubber is to improve the treadwear. Unfortunately, upon mixing nanomaterials in a rubber composition, such nanomaterials tend to reagglomerate and, therefore, increase the individual particle sizes which result in decreasing the benefits for which they are added. In addition, with increasing levels of nanomaterials in place of larger particles (>100 nanometers in diameter), the rubber becomes more hysteretic.

SUMMARY OF THE INVENTION

The present invention relates to rubber compositions containing a filler having aggregates containing two distinct particle sizes wherein the smaller particles are grafted onto the surface of the larger particles.

DETAILED DESCRIPTION OF THE INVENTION

There is disclosed a method of processing a rubber composition containing a filler comprising mixing
(a) 100 parts by weight of at least one rubber containing olefinic unsaturation; and
(b) 1 to 250 phr of a filler having individual aggregates containing both large and small particles wherein
  (1) the small particles range from 1 to 30 weight percent of the overall weight percent of said filler and the particle size of such small particles range from 1 to 16 nanometers;
  (2) the large particles range from 70 to 99 weight percent of the overall weight percent of said filler and the particle size of such large particles range from 17 to 500 nanometers in diameter; and
  (3) the small particles are grafted onto the surface of the large particles.

In addition, there is disclosed a rubber composition containing a filler comprising
(a) 100 parts by weight of at least one rubber containing olefinic unsaturation; and
(b) 1 to 250 phr of a filler having individual aggregates containing both large and small particles wherein
  (1) the small particles range from 1 to 30 weight percent of the overall weight percent of said filler and the particle size of such small particles range from 1 to 16 nanometers;
  (2) the large particles range from 70 to 99 weight percent of the overall weight percent of said filler and the particle size of such large particles range from 17 to 500 nanometers in diameter; and
  (3) the small particles are grafted onto the surface of the large particles.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g;, acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition should contain a sufficient amount of the filler having individual aggregates containing different particle sizes to contribute a reasonably high modulus and high resistance to tear. The filler may be added in an amount ranging from 1 to 250 phr. Preferably, such filler is present in an amount ranging from 35 to 110 phr.

The filler for use in the present invention is characterized by individual aggregates containing small particles that are grafted onto the surface of large particles. Small particles are intended herein to mean individual particles having diameters ranging from about 1 to 16 nanometers in diameter. Preferably, the small particles range in size of from 5 to 15 nanometers in diameter. Large particles are intended herein to mean individual particles having diameters ranging from about 17 to 500 nanometers. Preferably, the large particles range in size of from 17 to 30 nanometers in diameter.

The small particles range from 1 to 30 weight percent of the overall weight percent of filler. Preferably, the small particles range from 5 to 20 weight percent of the overall weight percent of filler.

The large particles range from 70 to 99 weight percent of the overall weight percent of filler. Preferably, the large particles range from 80 to 95 weight percent of the overall weight of filler.

The filler comprising the above-described small and large particles may be carbon black, modified carbon black, silica, modified silica, silicon carbide, boehmite, synthetic aluminosilicates, natural aluminosilicates, titanium dioxide and organic fillers such as ground forms of polystyrene, polypropylene, polyurethane and phenolic resins. According to one embodiment of the present invention, the small particles are made up from the same type of material, such as carbon black, as the large particles. According to another embodiment, the small particles are made up from a different material than the large particles.

A principle of the present invention is to use aggregates containing large particles as a carrier for the small particles that are grafted onto the surface of the large particle. Therefore, mere mixtures of aggregates of small particles and aggregates of large particles are not considered as the subject of this invention.

Various large particles can be used as the carrier to prepare the filler used in the present invention. For example, carbon blacks may be used. According to ASTM D-2516-6A, a number system for classifying the particle size of carbon black is recommended in which only the first number has meaning; so 0 as the first digit means a particle size of 1 to 10 nanometers; 1 as the first digit means a particle size of 11–19 nanometers; 2 means a particle size of 20–25 nanometers; 3 means 26–30 nanometers; 4 means 31–39 nanometers; 5 means 40–48 nanometers; 6 means 49–60 nanometers; and 7 means 61–100 nanometers. Accordingly, carbon blacks particularly useful for the large particles are characterized by first integers of 5 through 7. Carbon black particularly suited for the small particles are characterized by first integers of 1 through 3.

Representative carbon blacks which are suitable for the large particles include those known under the ASTM designation S212, N219, N220, N231, N234, N242, N270, N285, N293, N294, S300, S301, S315, N326, N327, N330, N332, N339, N347, N351, N356, N358, N363, N375, N539, N542, N550, N568, N601, N650, N660, N683, N741, N754, N762, N765, N774, N785 and N787. The preferred carbon blacks are N550 and N660.

Representative carbon blacks which are suitable for the small particles include those known under the ASTM designations N103, N110, N121 and N166. The preferred carbon blacks are N103 and N110.

Siliceous fillers that can be used as the small and/or large particles include, for example, silicates and both pyrogenic and precipitated finely dispersed silicas. Such highly dispersed silicas (silicon dioxide) for use as the small particles have a BET surface area in the range of between 150 and 400 and preferably from 170 to 300 square meters per gram. Such highly dispersed silicas for use as the large particles have a BET surface area in the range of between 50 and 140 and preferably from 75 to 130 square meters per gram. The BET method of measuring surface area is described in the Journal of the American Chemical Society, Volume 60, page 304 (1930).

Such silica fillers can be produced, for example, by precipitation from solutions of silicates; eg, sodium silicate, by hydrolysis and/or oxidative high temperature conversion. The silica fillers can also be produced by a silica Sol-Gel process including other metal-oxide gels, such as $ZrO_2$, $TiO_2$ and $Al_2O_3$. There can also be used flame hydrolysis of volatile silicon halides; eg, silicon tetrachloride, or by electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (zirconium oxide) or titanium (titanium dioxide).

Synthetic silicates include, for example, aluminum silicate or alkaline earth silicates, such as magnesium or calcium silicates with specific surface areas of from about 20 to 400 square meters per gram.

The siliceous filler may be of the type obtained by precipitation from a soluble silicate; eg, sodium silicate. For example, siliceous pigment produced according to the method described in U.S. Pat. No. 2,940,830 can be used. These precipitated amorphous hydrates silica pigments have an $SiO_2$ content of at least 80 or 85, preferably at least 90, more preferably 93–97 percent by weight on an anhydrous basis; ie, including bound water.

Silicon carbide particles may be used and, in particular, for the large particles. Commercially available silicon carbide particles range from 5 to 150 nanometers in size.

Boehmite is a mineral consisting of an orthorhombic form of aluminum oxide and hydroxide found in bauxite. Boehmite is known to be available in particle sizes ranging from 3 to 150 nanometers in diameter.

The small particles are grafted onto the surface of the large particles. The grafting can be by electrostatical coating, direct synthesis and/or chemical coupling.

During electrostatic coating, the surface charges (zeta-potential) of the large and small particles are matched to one another in such a way that coagulation of the smaller particle, such as carbon black, on the surface of the large particle, such as SiC, occurs because of the different charge signs. Studies of the curve the zeta potential as a function of the pH have shown that SiC at a pH>3–4 has a negative zeta potential. For electrostatic coating with carbon black, this means that the carbon black must display a positive zeta potential in this pH range.

The direct synthesis route is particularly relevant when both the large and small articles are silica. The direct synthesis may involve a discontinuous precipitation method or a continuous precipitation method. In accordance with the discontinuous precipitation method, the large particles and small particles are separately precipitated in different tanks, such as by adding acids, base or catalysts. During the phase of growing of the elementary particles, the large and small particles are combined so that the small particles locate themselves on the surface of the large particles. The continuous precipitation method involves precipitation of a sodium silicate solution and subsequent growing conditions conducive to the formation of the large particles. The growth process is then terminated and the conditions conducive to the formation of the small particles are initiated and maintained for a time sufficient to promote the surface of the large particles as a crystallization nucleus for the small particles.

The principle behind chemical coupling is to chemically anchor via chemical bridges the small particles to the surface of the large particle. For example, trialkoxy silylalkylamines may be used to couple carbon black to the SiC surface, carbon black to carbon black, silica to carbon black and boehmite to carbon black. In this instance, the grafting takes place via a condensation reaction between the carboxyl group on the carbon black surface and the functional groups on the trialkoxysilylalkylamine.

Another chemical coupler that may be used include the below described sulfur containing organosilicon compounds of Formula I. These may be used to couple carbon black to carbon black, silica to silica, and silica to carbon black. In addition, to function as the coupler between the large and small particles, the rubber compound containing the aggregates having the large and small particles may additionally contain a sulfur containing organosilicon compound. Examples of suitable sulfur containing organosilicon compounds are of the formula:

$$Z\text{—Alk—}S_n\text{—Alk—}Z \qquad (I)$$

in which Z is selected from the group consisting of

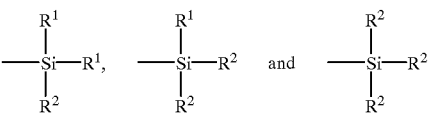

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxysilylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3,-bis(trimethoxysilyl-2-methylpropyl) tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis(triethoxysilylpropyl)tetrasulfide. Therefore as to Formula I, preferably Z is

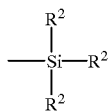

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula I in a rubber composition will vary depending on the level of filler, such as silica, that is used. The level of the sulfur containing organosilicon compound may range from 0.1 to 40 phr. Preferably, the level ranges from 5 phr to 15 phr. Phr means herein parts by weight per 100 parts by weight of rubber. Generally speaking, the amount of the compound of Formula I will range from 0 to 1.0 parts by weight per part by weight of the silica. Preferably, the amount will range from 0 to 0.4 parts by weight per part by weight of the silica.

It is readily understood by those having skill in the art that the rubber composition would be compounded by methods generally known in the rubber compounding art, such as mixing the various sulfur vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and filler having two particle sizes are mixed in one or more non-productive mix stages. The terms "non-productive" and "productive" mix stages are well known to those having skill in the rubber mixing art. The rubber composition containing the filler having two particle sizes as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition containing a filler comprising mixing
   (a) 100 parts by weight of at least one rubber containing olefinic unsaturation; and
   (b) 1 to 250 phr of a filler having individual aggregates containing both large and small particles wherein
      (1) the small particles range from 1 to 30 weight percent of the overall weight percent of said filler and the particle size of such small particles range from 1 to 16 nanometers in diameter;
      (2) the large particles range from 70 to 99 weight percent of the overall weight percent of said filler and the particle size of such large particles, range from 17 to 500 nanometers in diameter; and
      (3) the small particles are grafted onto the surface of the large particles.

2. The method of claim 1 wherein said rubber containing olefinic unsaturation is selected from the group consisting of natural rubber and synthetic rubber.

3. The method of claim 2 wherein said synthetic rubber is selected from the group consisting of conjugated diene homopolymers and copolymers and from copolymers of at least one conjugated diene and aromatic vinyl compound.

4. The method of claim 1 wherein a sulfur containing organosilicon compound is present and is of the formula:

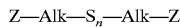

in which Z is selected from the group consisting of

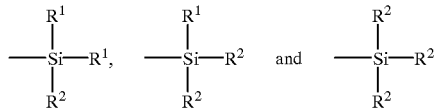

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

5. The method of claim 2 wherein sulfur containing organosilicon compound is present in an amount ranging from 0.01 to 1.0 parts by weight per part by weight of the silica.

6. The method of claim 1 wherein said small particles range from 5 to 20 weight percent of the overall weight percent of the filler.

7. The method of claim 1 wherein said small particles range from 5 to 15 nanometers in diameter.

8. The method of claim 1 wherein said large particles range from 80 to 95 weight percent of the overall weight percent of the filler.

9. The method of claim 1 wherein said large particles range from 17 to 30 nanometers in diameter.

10. The method of claim 1 wherein said filler is selected from the group consisting of carbon black, silica, silicon carbide, boehmite, titanium dioxide and aluminosilicates.

11. The method of claim 10 wherein said small particles are the same type of filler as the large particles.

12. The method of claim 10 wherein said small particles are a different type of filler from the large particles.

13. The method of claim 1 wherein said rubber elastomer containing olefinic unsaturation is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

14. The method of claim 1 wherein said rubber composition is thermomechanically mixed at a rubber temperature in a range of from 140° C. to 190° C. for a mixing time of from 1 to 20 minutes.

15. The method of claim 1 wherein the small particles are grafted onto the surface of the large particles by electrostatical coating.

16. The method of claim 1 wherein the small particles are grafted onto the surface of the large particles during their synthesis.

17. The method of claim 1 wherein the small particles are grafted onto the surface of the large particles by chemical coupling.

18. A rubber composition containing a filler comprising
    (a) 100 parts by weight of at least one rubber containing olefinic unsaturation; and
    (b) 1 to 250 phr of a filler having individual aggregates containing both large and small particles wherein
       (1) the small particles range from 1 to 30 weight percent of the overall weight percent of said filler and the particle size of such small particles range from 1 to 16 nanometers;
       (2) the large particles range from 70 to 99 weight percent of the overall weight percent of said filler and the particle size of such large particles, range from 17 to 500 nanometers in diameter; and
       (3) the small particles are grafted onto the surface of the large particles.

19. The composition of claim 18 wherein the small particles are grafted onto the surface of the large particles by electrostatical coating.

20. The composition of claim 18 wherein the small particles are grafted onto the surface of the large particles during their synthesis.

21. The composition of claim 18 wherein the small particles are grafted onto the surface of the large particles by chemical coupling.

22. The composition of claim 18 wherein said rubber containing olefinic unsaturation is selected from the group consisting of natural rubber and synthetic rubber.

23. The composition of claim 22 wherein said synthetic rubber is selected from the group consisting of conjugated diene homopolymers and copolymers and from copolymers of at least one conjugated diene and aromatic vinyl compound.

24. The composition of claim 18 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

25. The composition of claim 18 wherein said small particles range from 5 to 20 weight percent of the overall weight percent of the filler.

26. The composition of claim 18 wherein said small particles range from 5 to 15 nanometers in diameter.

27. The composition of claim 18 wherein said large particles range from 80 to 95 weight percent of the overall weight percent of the filler.

28. The composition of claim 18 wherein said large particles range from 17 to 30 nanometers in diameter.

29. The composition of claim 18 wherein said filler is selected from the group consisting of carbon black, silica, silicon carbide, boehmite, titanium dioxide and aluminosilicates.

30. The composition of claim 29 wherein said small particles are of the same type of filler as the large particles.

31. The composition of claim 29 wherein said small particles are a different type of filler from the large particles.

32. The composition of claim 18 wherein said composition is thermomechanically mixed at a rubber temperature in a range of from 140° C. to 190° C. for a total mixing time of from 1 to 20 minutes.

33. The composition of claim 18 wherein a sulfur containing organosilicon compound is present and is of the formula:

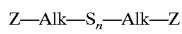

in which Z is selected from the group consisting of

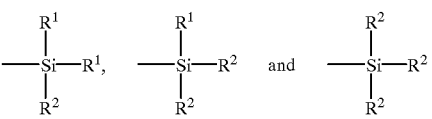

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

34. The composition of claim 33 wherein said sulfur containing organosilicon compound is present in an amount ranging from 0.01 to 1.0 parts by weight per part by weight of said silica.

35. A sulfur vulcanized rubber composition which is prepared by heating the composition of claim 18 to a temperature ranging from 100° C. to 200° C. in the presence of a sulfur vulcanizing agent.

36. The rubber composition of claim 18 in the form of a tire, belt or hose.

37. A tire having a tread comprised of the composition of claim 34.

* * * * *